Patented July 28, 1931

1,816,285

UNITED STATES PATENT OFFICE

ERLING JOHNSON, OF ODDA, NORWAY, ASSIGNOR TO THE FIRM ODDA SMELTEVERK A/S, OF ODDA, NORWAY

PROCESS OF CONVERTING PHOSPHATE ROCK INTO SOLUBLE COMPOUNDS AND OF SEPARATING ITS CONTENT OF LIME AND PHOSPHORIC ACID

No Drawing. Application filed September 9, 1929, Serial No. 391,506, and in Norway October 27, 1928.

For converting phosphate rock into soluble compounds several processes are known. The common processes require the use of sulphuric acid, which as a ballast has several drawbacks and also causes costs. It has also been proposed to replace the sulphuric acid by nitric acid. This has the advantage that the nitrogen of the nitric acid is utilized as the nitric acid combines with the lime of the phosphate rock.

The nitric acid using processes as hitherto proposed show however likewise considerable drawbacks and involve relatively high costs, owing partly to the fact that the nitrogen and phosphoric acid containing products or fertilizers obtained by these processes are of a strongly hygroscopic nature, and partly because the processes which lead to a satisfactory product of appropriate composition are rather complicated.

So it has for instance been proposed by use of a low grade nitric acid to prepare a relatively dilute solution from which the total content of lime from the phosphate rock was obtained as sulphate of calcium by precipitation with ammonium sulphate or similar substances.

Further it has been proposed to treat the phosphate rock with a larger excess of highly concentrated nitric acid. As for instance to treat 50 parts of finely ground phosphate rock with 45 parts of nitric acid of a specific gravity of 1,52 (99,67 per cent $HNO_3$) respectively to use a nitric acid of 80 per cent or more. In order to obtain a thorough reaction by means of a nitric acid of such grade it proved indispensable to carry out the reaction under simultaneous grinding of the phosphate rock in a ballmill or the like. From the product of reaction, which is obtained in a practically dry state and contains the nitrate of calcium, the phosphoric acid is removed by washing with a large excess, for instance, 150 parts, of nitric acid of the said grade. According to this process so high grade acid and such working conditions are used that the nitrate of calcium formed is practically insoluble. And the nitrate of calcium which results after removal of the phosphoric acid from the product of reaction does not form well developed and easily filterable crystals with the theoretical content of water corresponding to the formula $Ca(NO_3)_2 4H_2O$.

According to the present invention I use nitric acid of such grade, in such quantity and under such conditions that the lime content of the rock phosphate is brought into soluble form and I obtain thereby not only a simpler and more commodious treatment of the rock phosphate without needing ball-mills or similar apparatus but by using appropriate concentrations and temperatures, eventually by using suitable cooling I obtain the bulk of the lime content of the phosphate rock from the solution resulting from the treatment of the phosphate rock with nitric acid by crystallization as well-formed crystals of the composition $Ca(NO_3)_2 4H_2O$ with the theoretical content of water.

By this process of mine new ways and possibilities are established for a far more favourable utilization of rock phosphates, technically as well as economically, as compared with the processes hitherto in use.

My new process appears particularly profitable for use of the nitric acid produced by burning synthetic ammonia and absorbing the nitrogen oxides in water. This process easily gives an acid of 50 per cent which may be directly utilized in my process.

I have stated that by treating phosphate rock with nitric acid of this grade and in theoretical quantities for converting the calcium phosphate and calcium carbonate, eventually with an appropriate excess of acid, it is possible to obtain a solution of such grade that perfectly pure nitrate of calcium ($Ca(NO_3)_2 4H_2O$) is crystallized from the solution and by suitable cooling in quantities corresponding to 80 per cent and more of the lime present. The crystals of calcium nitrate are easily separated from the solution on a filter or in a centrifugal machine in a quite dry state and may be further utilized in any known manner. The mother liquor which consists of a relatively high grade solution of phosphoric acid with little nitrate of lime and eventually may contain an excess of free nitric acid is particularly adapted for the manufacture of compound fertilizers, phosphoric acid, ammonium phosphates, alkali phosphates, chemical salts etc. according to various processes.

In the manner mentioned above the rock phosphate is quite easily and at very low cost decomposed into a valuable nitrogen fertilizer as nitrate of lime on the one hand, and into a high grade solution of phosphoric acid on the other hand.

It is probably due to the high solubility of calcium nitrate in water that till now nobody has discovered this technically sufficient and economically very profitable decomposition of rock phosphate into its components, the great merit of which is that the bases as well as the acid of the rock phosphate are directly utilized to the full extent. As compared with the recent smelting processes the process outlined above has the merit, that it is carried out at ordinary temperature in a very simple plant and with very low power consumption. The evaporation costs are likewise low, because the process is operating with relatively strong solutions as compared with the processes in which sulphuric acid is used.

By the use of a very small excess of nitric acid of suitable concentration it is even possible to obtain on the one hand an immediate crystallization of calcium nitrate while on the other hand for instance by simple neutralization of the remaining liquor with ammonia a compound fertilizer is obtained, which only needs a simple drying in order to give a spreadable product.

Some examples may be given to illustrate the various manners in which our process may be carried out.

An Algerian phosphate was used with a content of 35,0 per cent $P_2O_5$ (equivalent to 76,4 per cent $Ca_3(PO_4)_2$ and 10 per cent $CaCO_3$.

When 100 parts of this phosphate are treated with nitric acid, the said constituents will consume 93,2+12,6=105,8 parts of $HNO_3$=23,5 parts of N. When nitric acid of 50 per cent is used, the theoretical consumption is 211,6 parts by weight or 160 parts by volume of an acid of specific gravity 1,317.

For each of the following tests 80 parts of rock phosphate was used, which theoretically requires 169,3 parts by weight or 128 parts by volume of 50 per cent nitric acid.

Test 1

80 parts of rock phosphate were dissolved under stirring in 200 parts of 50 per cent nitric acid, representing an excess of 15 per cent. Through the heat of reaction the temperature of the mixture rises to 60–70° C., and after a short period of agitation the soluble constituents of the phosphate are dissolved. Carbonic acid escapes and the liquid is frothing which causes some difficulties. Insoluble impurities were removed by filtering on a vacuum filter.

The filtering operation went on slowly on account of the finely divided insoluble, almost colloidal particles partly of organic, partly of inorganic nature left by the phosphate. The filtrate was treated further in the manner described below.

Test 2

The mixture of nitric acid and rock phosphate obtained as in the foregoing test was left to stand for 24 hours at 30–40° C. and was then filtered while warm. Now the filtering went on far more quickly. The solution was worked up as described under test 3.

Test 3

The rock phosphate was weakly roasted before the treatment with nitric acid in order to render harmless organic substances and other impurities, which may cause frothing and slow filtration. By removing the organic substances also formation of nitrogen oxides during the dissolution of the phosphate is avoided. 80 parts of phosphate, rendering 75 parts of calcined product were quickly dissolved by treatment with 200 parts of nitric acid of 50 per cent almost without frothing and without formation of oxides of nitrogen. Escaping nitric acid vapors and fluor compounds were not utilized in this test, they may however easily be recovered, respectively be rendered innocuous by known means.

The reaction product, respectively the solution obtained, was filtered while warm in order to remove insoluble impurities. The filtration went on quite readily. On the filter a residue was left, which after drying without washing amounted to 8,5 parts by weight. After washing with a small quantity of water and subsequent drying the weight of the insoluble residue was reduced to 5 parts and it was free from nitric acid. This washing operation gives a dilute solution of calcium nitrate and phosphoric acid, which may be conveyed to the nitric acid tower in order to avoid evaporation.

The clear filtrate, mainly containing free phosphoric acid, an excess of nitric acid and calcium nitrate was cooled down to 10° C. below zero. Upon dropping a crystal of calcium nitrate into the solution, this salt immediately crystallized out as $Ca(NO_3)_2 4H_2O$ and was separated on a vacuum filter. 130 parts of calcium nitrate were obtained which immediately after filtering showed a content of 11,4 per cent nitrogen, and only a slight quantity of phosphoric acid owing to the liquor adhering surperficially to the crystals. By slow cooling quite pure large crystals with a content of 11,8 per cent nitrogen were easily obtained, the theoretical nitrogen content being 11,86 per cent.

The yield of nitrate crystals 130 parts is equivalent to somewhat more than 80 per cent of the calcium present, which theoretically should give 158,9 parts of crystallized nitrate. By stronger cooling and more efficient and quicker separation of the crystals, for instance in a centrifugal machine a considerable greater output of crystallized calcium nitrate may be obtained, and the adhering mother liquor may be almost perfectly removed.

The separated calcium nitrate, which has an acid reaction on account of the adhering mother liquor may upon admixture of some powdered lime rock or of lime for instance as hydrated lime or of some ammonia or ammonium carbonate be directly calcined and gives then the usual commercial product with 13,0—15,5 per cent of nitrogen. The product is of white colour and remarkable purity. The filtrate contains the rest of the lime content of the rock phosphate, the surplus of free nitric acid and the phosphoric acid.

The filtrate amounted to 95 parts by volume of a specific gravity of 1,4 i. e. 133 parts by weight. The solution contained:

20 per cent $P_2O_5$ as free phosphoric acid = 27,6 per cent $H_3PO_4$
2,6 per cent nitrogen as free nitric acid = 11,7 per cent $HNO_3$
2,6 per cent nitrogen as $Ca(NO_3)_2$ = 16,0 per cent $Ca(NO_3)_2$ Total of valuable compounds 55,3 per cent
and 44,7 per cent water
100,0 per cent The composition of the solution may however vary within rather wide limits. If the excess of nitric acid is less then that used in the above test or if a higher grade of acid is used, or if the crystallization of calcium nitrate is carried out to its utmost extent the solution may contain more free phosphoric acid and less free nitric acid and nitrate.

As will be seen from the example given only 44 per cent of water are to be removed in order to obtain anhydrous products. By the said measures the quantity of water may be further reduced.

The solution may very easily, even directly be converted into various products containing nitrogen and phosphoric acid. In this connection it is worth mentioning that according to the nitric acid processes hitherto proposed a convenient direct utilization of the solution for serviceable products is not possible.

By simple neutralization of the solution with ammonia and subsequent drying an excellent compound fertilizer was obtained with a content of 28,80 per cent total phosphoric acid, $P_2O_5$, 26,60 per cent of which are water-soluble and 2,20 per cent nitrate-soluble, and a content of 20,95 per cent nitrogen, of which 8,65 per cent are nitrate nitrogen and 12,30 per cent ammonia nitrogen. This product contains then some 50 per cent of plant food in excellently efficient and well balanced proportions of mixture. Physically the product has very favourable properties, it remains dry and is easy to spread.

The phosphoric acid is for the greater part in the form of monoammonium phosphate.

By an increased addition of ammonia di-ammonium phosphate is obtained together with some dicalcium phosphate which is however likewise wholly effective. The nitrogen is present partly as ammonium nitrate, partly as ammonium phosphates. Also calcium nitrate may be present if the addition of ammonia was insufficient.

The relative ratio between the components may vary within wide limits according to the quantity of nitric acid used for conversion of the phosphate rock and the quantity of nitrate crystallized out as well as according to the quantity of ammonia used for neutralization etc.

Test 4

The following test illustrates the use of a somewhat larger excess of nitric acid:

80 parts of phosphate rock, respectively 75 parts of roasted phosphate, were dissolved while stirring in 210 parts by weight of nitric acid of 1,4 specific gravity. Insoluble impurities were separated by filtration but may naturally be removed in any other convenient way as for instance in a Dorr apparatus. The filtrate was cooled down to 15° C. below zero and the calcium nitrate crystallized out, 135 parts, were separated from the mother liquor on a vacuum filter. The surplus of nitric acid makes the solution less viscous and facilitates filtration. However such surplus is not of absolute necessity. The filtered solution was partly worked up by neutralization with ammonia in the manner above described, partly it was freed from the excess of nitric acid to the desired extent by distillation before further treatment.

Finally a test may be given, in which nearly the theoretical quantity of nitric acid is used.

Test 5

100 kgs. of phosphate rock were dissolved in 250 kgs. of nitric acid of 55 per cent, which corresponds to a surplus of 4 per cent over the quantity of acid theoretically required.

The filtered solution amounted to 340 kgs. and had the following composition:

10,3 per cent P₂O₅ = 35,02 kgs. P₂O₅ = 48,3 kg. H₃PO4
8,64 per cent Nitrate N = 29,4 kgs. N. = 172,2 kg. Ca(NO₃)₂
0,36 per cent Nitric acid N = 1,22 kgs. N. = 5,5 kg. HNO₃

Total           226,0 kgs.
Rest (essentially water) 114,0 kgs.
                340,0 kgs.

Upon cooling down to 15° C. below zero 92 per cent of the calcium nitrate in the solution crystallized out. 229 kgs. of crystallized calcium nitrate $Ca(NO_3)_2.4H_2O$ were obtained, corresponding to 158,4 kgs. of $Ca(NO_3)_2$ and 70,6 kgs. of water of crystallization.

After filtration or centrifuging of the calcium nitrate, which was obtained nearly dry 111 kgs. of mother liquor resulted, which contained the components in the following proportions:

48,3 kgs. of H₃PO₄
13,8 kgs. of Ca(NO₃)₂    } = 60,9 per cent valuable
5,5 kgs. of HNO₃                        substances
43,4 kgs. rest (mainly water) = 39,1 per cent 111,0 kgs.

The mother liquor obtained according to the tests given above represents obviously a novel technical intermediate product, which may be worked upon a great variety of valuable fertilizers.

The mother liquor may even without the least difficulty be obtained of such concentration, that upon neutralization of the finely divided or atomized solution with ammonia gas dry spreadable products may immediately result.

When the alterations are considered which the solution undergoes by separation of the crystallized calcium nitrate a very important fact is stated. The phosphoric acid left in solution increases in concentration very materially, not only because the nitrate as such is removed, but a considerable further concentration of the solution takes place because a part of the water of the solution is simultaneously removed as water of crystallization of the $Ca(NO_3)_2.4H_2O$. A further advantage of the novel process is constituted by the fact, that the phosphoric acid solution proves to be quite an excellent medium of crystallization for the calcium nitrate, and highly promotes the formation of well developed crystals. Particularly this latter fact was very surprising, because indeed no further calcium salts or calcium ions are present which might promote the separation of calcium nitrate. The solubility of crystallized calcium nitrate in water, gives even at zero a concentration of 69% of $Ca(NO_3)_2.4H_2O$. Even at still lower temperature the solubility of the salt in water is a very high one. At 12,9° C. below zero the solution contains 30 per cent $Ca(NO_3)_2$ or 43 percent $Ca(NO_3)_2.4H_2O$. It is well known that by cooling of solutions of calcium nitrate, also of the solutions mentioned above, ice is first frozen out. (See Gemelin Kraut 1909 vol. 2² page 216 and Guthrie Phil Mag (5) 1 page 354,446 etc.)

The recognition of the applicant that the presence of phosphoric acid is reversing this condition and allows an almost quantitative separation of calcium nitrate, is obviously of the greatest importance for applicant's process.

The new process is not limited to the examples given, but may be varied in several ways. So the nitric acid may be used in lower or higher concentration, although it does not mean any advantage economically to use an acid of more than 80 per cent or less than, say 40 per cent. Further it is possible to use a quantity of nitric acid which to a certain extent is short of the theoretical requirement as well as on the other hand a greater excess of nitric acid may be used, although it is of no advantage to the process to use a quantity of acid equalizing several times the requirement for combining with the lime content of the phosphate rock.

When a mineral phosphate is used with a relatively considerable content of impurities such as aluminium and iron compounds, calcium fluoride etc. it may be of advantage to use only just so much nitric acid as is necessary to combine with the calcium phosphate and the calcium carbonate of the mineral, in some cases even a little less so that in the first stage of the process some monophosphate of calcium remains undecomposed in order to keep the bulk of impurities undissolved and able to be separated by filtration. After removal of the impurities some further nitric acid may be added in a second stage of the process before the crystallization of the calcium nitrate is effected.

If on the other hand the raw material contains only slight quantities of insoluble impurities, the filtration of the latter may be dispensed with and the reaction product, respectively the solution, may immediately be cooled for crystallization of calcium nitrate. The latter will then contain insoluble impurities if any, but if these impurities are of harmless character even this simplified process will give a useful product, although the separation of the crystallized nitrate from the solution does not proceed quite so readily.

The grade of cooling may be varied within wide limits, even down to the freezing-point of the solution. If a somewhat concentrated solution is used a considerable quantity of calcium nitrate will crystallize out already upon cooling to 5 or 10° C. because only little more water needs be present than is taken up by the nitrate as water of crystallization.

If relatively dilute acid is used for treating the mineral phosphate, such as for instance a 30 per cent acid from air combustion processes, it is suitable to concentrate the product of reaction by evaporation before crystallization is effected.

The acid mother liquor adhering to the nitrate crystals is preferably removed by washing with an ammonium nitrate solution. That in this way appropriate quantities of ammonium nitrate are introduced into the mother liquor as well as into the crystal-mass may be of advantage. Instead of ammonium nitrate solution a cold calcium nitrate liquor or cold nitric acid, respectively other similar solutions, which have only little dissolving effect upon calcium nitrate, may be used for washing.

In order to assist the circulation and motion of the mixture of mother liquor and calcium nitrate crystals it may be convenient to introduce into the reaction product before or during the crystallization of calcium nitrate some cold mother liquor obtained from a previous operation.

It is pointed out that the new process above described may also be used for reaction products resulting from the action of nitrogen oxides on mineral phosphates in the presence of water.

I claim:

1. The process of converting phosphate rock and similar phosphate material into soluble compounds and of separating the content of lime and phosphoric acid of the phosphate material, comprising treating the phosphate material with nitric acid of less than 80 per cent, to form a solution containing calcium nitrate and free phosphoric acid, subjecting said solution to appropriate conditions as to temperature and concentration, crystallizing from said solution calcium nitrate of the formula $Ca(NO_3)_2.4H_2O$, and separating the crystals from the mother liquor.

2. The process of converting phosphate rock and similar phosphate material into soluble compounds and of separating the lime and phosphoric acid of the phosphate material, comprising treating the phosphate material with nitric acid of 45-65 per cent to form a solution containing calcium nitrate and free phosphoric acid, cooling said solution, crystallizing from the solution calcium nitrate of the formula $Ca(NO_3)_2.4H_2O$, and separating the crystals from the mother liquor.

3. The process of converting phosphate rock and similar phosphate material into soluble compounds and of separating the lime and phosphoric acid of the phosphate material, comprising treating said material with nitric acid of less than 80 per cent in a quantity which does not suffice for saturation of all basic components of the phosphate material, separating the solution obtained from the residues, cooling the solution, adding further quantities of nitric acid to the solution, crystallizing from the solution calcium nitrate of the formula $Ca(NO_3)_2.4H_2O$ and separating the crystals from the mother liquor.

4. The process of converting phosphate rock and similar phosphate material into soluble compounds and of separating the content of lime and of phosphoric acid of the phosphate material comprising treating the phosphate material with an excess of nitric acid preferably of the concentration of 45-65 per cent, to form a solution containing calcium nitrate and free phosphoric acid, separating the solution from residues, if any, removing from the solution the excess of nitric acid by distillation to the desired extent, cooling the solution, crystallizing from the solution calcium nitrate of the formula $Ca(NO_3)_2.4H_2O$, and separating the crystals from the mother liquor.

In testimony that I claim the foregoing as my invention I have signed my name.

ERLING JOHNSON.